Figure 1:
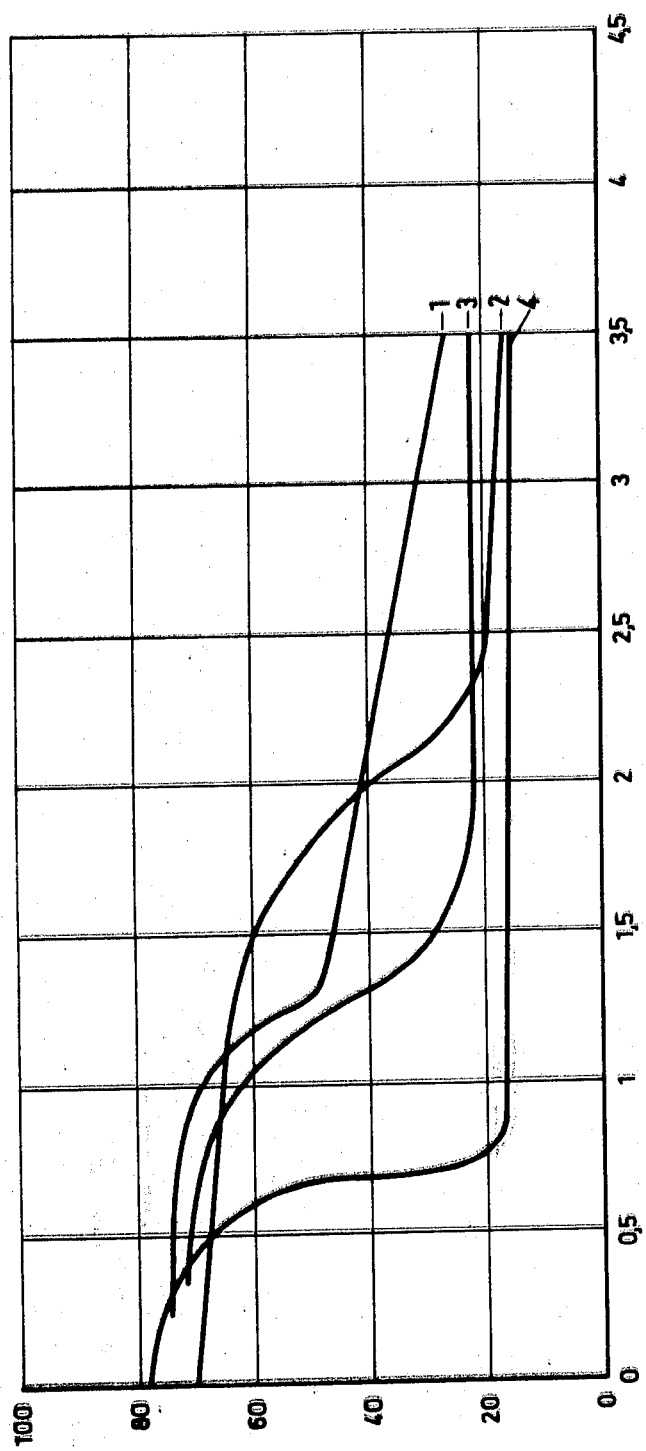

United States Patent [19]

Jabs et al.

[11] 3,970,618
[45] July 20, 1976

[54] PROCESS FOR THE PRODUCTION OF POLYURETHANE FOAMS

[75] Inventors: Gert Jabs, Schildgen; Günther Loew, Leichlingen; Johannes Niggemann, Leverkusen, all of Germany

[73] Assignee: Bayer Aktiengesellschaft, Leverkusen, Germany

[22] Filed: Jan. 30, 1974

[21] Appl. No.: 438,052

[30] Foreign Application Priority Data
Feb. 1, 1973 Germany............................ 2304892

[52] U.S. Cl. .............................. 260/2.5 AD; 47/58; 47/DIG. 7; 260/2.5 AM; 260/2.5 AT
[51] Int. Cl.² .................. C08G 18/14; C08G 18/77; C08G 18/48
[58] Field of Search................. 260/2.5 AD, 2.5 AT, 260/2.5 AM; 47/58, DIG. 7

[56] References Cited
UNITED STATES PATENTS

| | | | |
|---|---|---|---|
| 3,706,678 | 12/1972 | Dietrich | 260/2.5 AD |
| 3,805,532 | 4/1974 | Kistner | 260/2.5 AD |
| 3,812,618 | 5/1974 | Wood | 260/2.5 AD |
| 3,812,619 | 5/1974 | Wood | 260/2.5 AD |
| 3,821,136 | 6/1974 | Hudgin | 260/2.5 AD |
| 3,873,476 | 3/1975 | Jabs | 260/2.5 AG |

*Primary Examiner*—C. Warren Ivy
*Attorney, Agent, or Firm*—Joseph C. Gil; Gene Harsh

[57] ABSTRACT

Process for the production of a hydrophilic polyurethane foam having a high water retention capacity by reacting a polyhydroxyl compound having an OH number from 900–1800 and a polyisocyanate containing an aromatically bound isocyanate group and containing a urethane, urea, carbodiimide, allophanate, isocyanurate or biuret group.

3 Claims, 2 Drawing Figures

PROCESS FOR THE PRODUCTION OF POLYURETHANE FOAMS

It is known to use open-celled hydrophilic hard foams as culture substrates for the soil-free cultivation of plants. Processes using such foams have been described, for example, in U.S. Pat. Nos. 2,988,441 and 3,373,009; in German Auslegeschrift No. 1,299,662 and in the publication by E. Weinbrenner and J. Niggemann, in Gartenwelt 70 (1970), pages 71–73 entitled "Stecklingsvermehrung und Kultur in Blocksubstraten aus Polyurethan-Schaumstoff".

Hydrophilic polyurethane foams previously described, however, still have the following disadvantages for the generative and vegetative propagation of plants:

1. Cuttings planted in conventional polyurethane foams must be watered more frequently than in conventional substrates because these relatively large celled foams, in which 90% of the pores measure between 200 and 750 $\mu$, have insufficient water holding capacity.

2. When young plants which have been raised in polyurethane foam block substrates are transplanted into soil or peat culture substrates after they have rooted, the water in the foam is completely extracted on contact with the soil because soil has a much higher capillary activity.

This dehydration of the foam blocks is observed even if the soil is saturated with water. Since only the tips of the roots projecting from the synthetic substrate are then capable of absorbing water while most of the root substance remains in the dehydrated substrate, the plants suffer from retardation of growth or so-called transplantation shock.

These deficiencies in the development of the plants are due to the insufficient "suction potential" of the foam plastics produced by the known art. By suction potential is meant the pressure difference required to remove capillary water from porous materials.

It was, therefore, an object of this invention to provide a new process for the production of polyurethane foams which would not have the disadvantages mentioned above.

According to this invention, this problem can be solved by using certain polyhydroxyl compounds in combination with certain polyisocyanates in certain proportions by weight for the production of the polyurethane foams.

This invention relates to a process for the production of an open-celled hydrophilic polyurethane foam having a density from about 6 to about 30 kg/m$^3$, which, after saturation with water and the application of a suction potential equal to a 30 cm water column, has a water retention capacity of at least about 25 volume per cent, from a polyisocyanate, a polyhydroxyl compound, water and/or other blowing agents and the usual additives, which is characterized in that a. the polyhydroxyl compound used is a compound with a hydroxyl number from about 900 to about 1800 or a mixture of polyhydroxyl compounds having an average hydroxyl number from about 900 to about 1800 and b. the polyisocyanate used has at least one aromatically bound isocyanate group and contains at least one urethane and/or urea and/or carbodiimide and/or allophanate and/or isocyanurate and/or biuret group and is used in a quantity corresponding to from about 20 to about 60 per cent of the quantity theoretically required to react all of the active hydrogen atoms present in the reaction mixture which are capable of reacting with isocyanate groups.

The invention also relates to a substrate for the soil-free cultivation of plants, which substrate consists of a polyurethane foam obtained by this process.

The polyhydroxyl compound to be used in the process according to the invention is a polyhydroxyl compound which has a hydroxyl number of between 900 and 1800, preferably between 900 and 1200 or a mixture of polyhydroxyl compounds which mixture has an average hydroxyl number of between 900 and 1800, preferably between 900 and 1200. The mixture can also include polyhydroxyl compounds which have hydroxyl numbers of 300 to 900 but these can only be used in such proportions that the average hydroxyl number of the mixture will be at least about 900, which is an essential feature of the invention.

The following are examples of polyhydroxyl compounds suitable for the process according to the invention: Low molecular weight polyols such as ethylene glycol, propane-1,2-diol, propane-1,3-diol, butane-1,3-diol, butane-1,4-diol, glycerol, 1,1,1-trimethylolpropane, erythritol, pentaerythritol, sorbitol, sucrose, starch and addition products of ethylene oxide and/or propylene oxide with the above mentioned monomeric polyhydric alcohols or with ammonia and primary amines such as monoethanolamine, aniline and ethylene diamine.

The polyisocyanates used for the process according to the invention are modified polyisocyanates which contain aromatically bound isocyanate groups. By modified polyisocyanates are meant in this context solutions of 5 to 80 per cent by weight, preferably 10 – 50 per cent by weight of polyisocyanates which contain urethane and/or urea and/or carbodiimide and/or allophanate and/or isocyanurate and/or biuret groups or in the monomeric polyisocyanate which is used for the preparation of the polyisocyanates containing aforementioned groups.

Polyisocyanates which contain urethane groups can be prepared, for example, by reacting aromatic diisocyanates such as tolylene-2,4- or -2,6-diisocyanate and/or mixtures of these isomers with a less than equivalent quantity of a polyol of the type mentioned above.

Polyisocyanates which contain urea groups can be prepared, for example, by reacting in the absence of a solvent at a temperature from about −20°C. to about 80°C. an organic diisocyanate with a bis-secondary diamine such that the NCO/NH ratio is from about 2.5:1 to about 20:1.

Polyisocyanates which contain carbodiimide groups can be prepared, for example, as described in U.S. Pat. No. 3,152,162.

Polyisocyanates which contain allophanate groups can be prepared, for example, as described in British Patent Specification No. 994,890; U.S. patent application Ser. No. 260,342 filed on June 6, 1972; Belgian Patent Specification No. 761,626 or U.S. Pat. No. 3,769,318.

Polyisocyanates which contain isocyanurate groups can be prepared, for example, as described in German Patent Specifications No. 1,022,789 or 1,027,394 e.g. by subjecting diisocyanates such as 2,4- and/or 2,6-diisocyanatotoluol to a heat treatment at 40° – 180°C preferably in the presence of a catalyst such as potassium acetate.

The process according to the invention is preferably carried out using a modified polyisocyanate with aromatically bound isocyanate groups and especially modified tolylene-2,4-diisocyanate or its modified mixture with tolylene-2,6-diisocyanate. The preparation of partly biuretised polyisocyanate systems which are especially preferred has long been known in the art and has been described, for example, in U.S. Pat. No. 3,124,605. It is generally carried out by reacting the corresponding diisocyanate with water at a temperature of from 80° to 160°C. using a molar ratio of diisocyanate to water of at least 3:1, preferably in the presence of an emulsifier, for example an ethoxylated phenol. Generally speaking the modified polyisocyanates which are used in the process of the invention are obtained by subjecting an aromatic diisocyanate especially tolylene-diisocyanate to a partial modification reaction thus providing the solution mentioned hereinbefore.

The quantity of modified polyisocyanates used in the process according to the invention corresponds to 20 to 60 per cent of the quantity theoretically required for reacting all the hydrogen atoms present in the reaction mixture which are reactive with isocyanate groups.

The blowing agents used for the process according to the invention are water (used in quantities of 2 to 10 parts by weight per 100 parts by weight of polyhydroxyl mixture) and/or volatile halogenated hydrocarbons, especially monofluorotrichloromethane in quantities of up to 40 % by weight based on polyhydroxyl mixture.

Stabilizers suitable for the process according to the invention are in particular the polysiloxane compounds commonly used for the production of polyurethane foams, such as described in U.S. Pat. No. 3,201,372.

Surface active additives can also be used for the process according to the invention. Suitable emulsifiers are e.g. the sodium salts of ricinoleic sulphonates or of fatty acids or salts of fatty acids with amines such as oleic acid diethylamine or stearic acid diethanolamine. Alkali metal and ammonium salts of sulphonic acids such as dodecylbenzene sulphonic acid or dinaphthylmethane disulphonic acid or of fatty acids such as ricinoleic acid or of polymeric fatty acid can also be used as surface active additives; arylalkyl polyethers are also suitable for this purpose.

Known activators can also be used in the process according to the invention, in particular amines such as N,N-dimethylbenzylamine, triethylamine or triethylene diamine.

The components are reacted together by the known one-step process carried out either manually or mechanically.

The hydrophilic foams produced by the process according to the invention have a density of about 6 to 30 kg/m$^3$ and are distinguished by their exceptionally high suction potential.

The suction potential, known in the literature as the water-holding tension, is the pressure difference required to remove water bound by capillary tension from porous materials. It is usually expressed in terms of centimeters of water column, the decadic logarithm of this value (log cm water column) being known as the pF value. To empty a capillary of constant radius in which a water column of a given height has become established under normal conditions as a result of the equilibrium between gravity and capillary force, it is necessary to apply a suction potential which corresponds to the pressure of this water column. When a pressure difference is produced across a porous system, an equilibrium is established between the suction potential and the capillary tension, and a certain quantity of water remains behind in the porous system.

The suction potential curve is obtained by plotting the quantity of liquid remaining in the porous system against the suction potential. The curve obtained in this way is a characteristic curve which gives important information on the water economy or pore size distribution of the system and will therefore be used hereinafter to characterize the foams produced according to the invention. Further details concerning the suction potential and, in particular, the methods of measurement employed to determine it can be found in textbooks on soil science, e.g. Scheffer-Schachtschabel's "Lehrbuch der Bodenkunde", published by Ferd. Enke-Verlag Stuttgart, 6th Edition, 1966, pages 227–243.

It will be understood from what has been said above that when a foam which has a low suction potential comes into contact with soil which has a high suction potential, the water is removed from the pore system of the foam. The suction potential curves of the foams according to the invention are given in the examples which follow and may be seen to lie within a range in which dehydration by contact with soil occurs much more slowly.

Polyurethane foams produced by the process according to the invention have a water retention capacity of at least about 25 volume per cent and preferably at least about 30 volume per cent after saturation with water and application of a suction potential of a 30 cm water column. Because of the high suction potential of the foams produced by the process according to the invention, a sample of foam measuring 4 × 4 × 4 cm still contains at least 30 volume per cent of water after it has been saturated with water and left for 24 hours in garden soil or peat containing 60 per cent by weight of water.

In order to illustrate this invention in greater detail reference is made to the following examples wherein all percentages and parts are per cent or parts by weight unless otherwise indicated. In Examples 1 through 3 the stabilizer employed is a commercial polysiloxane obtained from Union Carbide Corporation under the designation L5310 and believed to be a polysiloxane-polyalkylene glycol having the average formula:

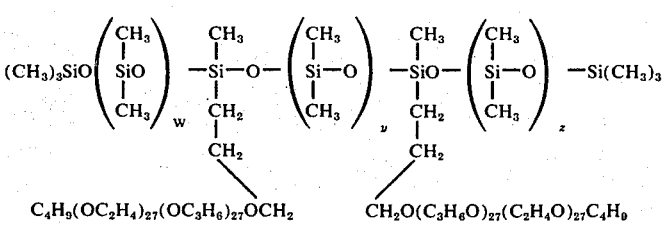

where the sum of $w$, $y$ and $z$ is about 16.

The stabilizer employed in Example 4 is a commercial stabilizer obtained from General Electric Co. under the designation SF 1109 and believed to be a dimethylsiloxane and polyethyleneoxide block copolymer containing no hydroxyl groups and having a Specific Gravity of 1.09 at 25°C.

EXAMPLE 1

About 20 Parts of a polyether of ethylene diamine and propylene oxide (hydroxyl number 630), 20 parts of a polyether of 1,1,1-trimethylolpropane and an ethylene oxide/propylene oxide mixture (molar ratio 2:1) (hydroxyl number 620), 20 parts by weight of glycerol (hydroxyl number 1820), 7 parts of water and 4 parts of a commercial polysiloxane stabilizer (L 5310) are stirred together. The mixture is then mixed with 80 parts of biuretised tolylene diisocyanate (33.3% isocyanate).

A foam which has a density of 15 kg/m$^3$ is obtained. The water absorbed by a 5 cm cube floating on water is 85 volume per cent within one minute.

EXAMPLE 2

About 20 Parts of a polyether of ethylene diamine and propylene oxide (hydroxyl number 630), 20 parts of a polyether of 1,1,1-trimethylolpropane and ethylene oxide/propylene oxide mixture (molar ratio 2:1) (hydroxyl number 670), 20 parts of glycerol (hydroxyl number 1820), 7 parts of water, 4 parts of a commercial polysiloxane stabilizer (L 5310) and 5 parts of dodecylbenzene polyglycol ether ($n = 17$) are stirred together. The mixture is then mixed with 80 parts of biuretised tolylene diisocyanate (33.3% isocyanate).

A foam with a density of 17 kg/cm$^3$ is obtained. A cube with a length of side of 5 cm floating on water absorbs 85 volume per cent of water within one minute.

EXAMPLE 3

About 10 Parts of glycerol (hydroxyl number 1820), 10 parts of diethylene glycol, 20 parts of a polyether of ethylene diamine and ethylene oxide/propylene oxide (ratio 1:1) (hydroxyl number 650), 10 parts of a polyether of trimethylolpropane and ethylene oxide (hydroxyl number 620), 10 parts of ethylbenzene polyglycol ether ($n = 17$), 7 parts of water and 3 parts of commercial polysiloxane stabilizer (L 5310) are stirred together. The mixture is then mixed with 65 parts of a partly isocyanurate-modified mixture of tolylene-2,4- and -2,6-diisocyanate (ratio 1:4) (isocyanate content 39%).

A foam with a density of 18 kg/m$^3$ is obtained. A cube of this foam with a length of side of 5 cm floating on water absorbs 80 volume per cent of water within 2 minutes.

To obtain a comparison of the suction potential, a hydrophilic hard foam is produced according to the known art from the following formulation:

EXAMPLE 4 (COMPARISON EXAMPLE)

20 Parts of a polyether of ethylene diamine and propylene oxide (hydroxyl number 485), 5 parts of a polyether of 1,1,1-trimethylolpropane and propylene oxide (hydroxyl number 385), 10 parts of a polyester of adipic acid, phthalic acid, glycerol and 1,1,1-trimethylolpropane (hydroxyl number 380), 5 parts of 1,1,1-trimethylolpropane (hydroxyl number 1260), 10 parts of diethylene glycol (hydroxyl number 1060), 7.5 parts of water, 0.5 parts of N,N-dimethylbenzylamine as activator and 1.5 parts of a stabilizer based on polysiloxane (SF 1109) are stirred together. They are then mixed with 65 parts of polyphenylpolymethylenepolyisocyanate which has been prepared by anilineformaldehyde condensation followed by phosgenation (31% isocyanate content). A foam with a density of 13 kg/m$^3$ is obtained. A 5 cm cube of this foam floating on water absorbs 65% of water in the course of one hour.

In FIG. 1, curves 1, 2 and 3 are the suction potential curves of the foam substrates produced according to the invention in Examples 1 to 3 and curve 4 is the suction potential curve of the substrate produced for comparison in Example 4. The numerical values along the ordinate represent the water content in volume per cent and the numerical values along the abscissa represent the pF values.

EXAMPLE 5 (EXAMPLE OF PRACTICAL APPLICATION)

Cubes with a length of side of 4 cm were cut out of foams produced according to Examples 1 to 4, each cube representing one substrate unit for vegetative plant propagation. The cubes were saturated with water and embedded in standardized soil (Paul Balster, Unna) which had a moisture content of 60 per cent by weight. The water content of the cubes was assessed by weighing after various lengths of time in the soil.

Figure 2:
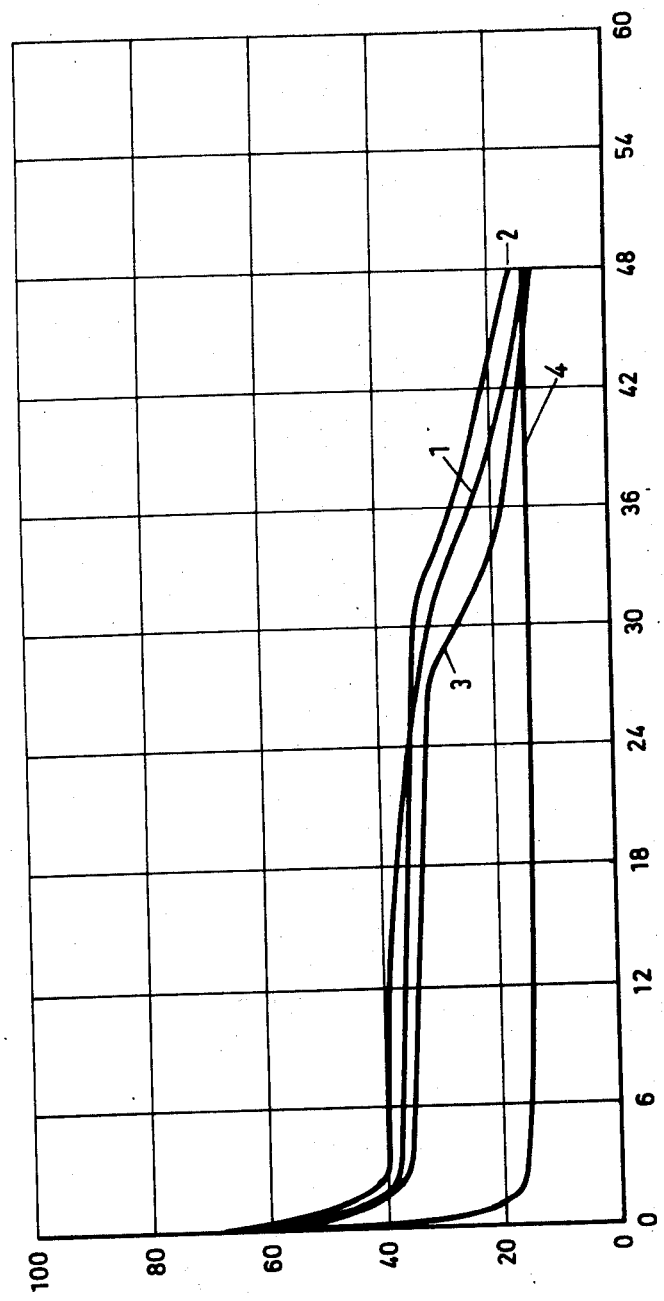

FIG. 2 shows the relationship between the water content of the samples and the length of time in the soil. The figures along the ordinate represent the water content in volume per cent and the figures along the abscissa the length of time in hours at 20°C. Curves 1, 2 and 3 correspond to the substrates according to the invention produced according to Examples 1 to 3 above and curve 4 corresponds to the comparison substrate described in Example 4.

I claim:
1. A proces for the production of open-celled hydrophilic polyurethane foam having a density of from about 6 to about 30 kg/m$^3$ which, after saturation with water an application of a suction potential of 30 cm water column, has a water retention capacity of at least 25 volume % which process comprises reacting organic polyisocyanates and polyhydroxyl compounds, while in the presence of a blowing agent and an emulsifier, characterized in that:
A. the polyhydroxyl compound is selected from the group consisting of
  i. compounds having a hydroxyl number from about 900 to about 1800, and
  ii. mixtures of compounds having a hydroxyl number from about 900 to about 1800, and compounds having hydroxyl numbers from about 300 to about 900, said mixtures having average hydroxyl numbers from about 900 to about 1800,
B. the organic polyisocyanate have at least one aromatically bound isocyanate group containing at least one group selected from the class consisting of urethane, urea, carbodiimide, allophanate, isocyanurate and biuret groups, wherein said polyisocyanates comprise from 5 to 80% by weight of said polyisocyanate containing at least one of said groups and the balance being the monomeric polyisocyanate which is used for the preparation of said polyisocyanates and,

C. said organic polyisocyanates being used in a quantity corresponding to from about 20 to about 60% of the quantity theoretically required for reacting all the hydrogen atoms present in the reaction mixture which are reactive with isocyanate groups.

2. The process of claim 1 wherein the polyhydroxyl compound has a hydroxyl number from about 900 to about 1200.

3. A substrate for the soil-free propagation and cultivation of plants, consisting of a polyurethane foam obtainable according to claim 1.

* * * * *